June 15, 1926.

C. BOCH

POULTRY STICKING AND BLEEDING FRAME

Filed Dec. 5, 1925

1,589,100

Inventor:
Carl Boch
By Fetherstonhaugh & Co.
Att'y.

Patented June 15, 1926.

1,589,100

UNITED STATES PATENT OFFICE.

CARL BOCH, OF CALGARY, ALBERTA, CANADA.

POULTRY STICKING AND BLEEDING FRAME.

Application filed December 5, 1925. Serial No. 73,477.

My invention relates to a frame to be used in the sticking and bleeding of turkeys and domestic fowls, and the object of my invention is to facilitate the work of killing and bleeding turkeys and domestic fowls by persons lacking the skill and experience of the skilled poultry killers and dressers.

In the sticking of turkeys and fowls, as practiced by experienced and skilled poultry killers, a point in the brain is pierced with a knife inserted in the roof of the mouth. The result of the proper application of this method is that for several minutes after the sticking, the feathers of the turkey or fowl are readily and easily removable without the application of hot water and without tearing the skin of the bird. The skill and ability to stick properly as above outlined are acquired only after long practice, and the proper application of this method of sticking is a secret known to only a limited number of persons.

The requirements of the produce trade call for turkeys and poultry bled from the interior of the mouth. Bleeding birds in this manner is also a skilled occupation.

To permit the proper performance of these operations of sticking and bleeding turkeys and fowls by persons unskilled in the work, I provide a sticking and bleeding frame whereby the head of the turkey or fowl is held in the correct position in relation to a knife, the direction, penetration and swing of which are governed by the frame, with the result that when sticking and bleeding a turkey or fowl the knife is inserted at the proper point, and in the proper direction, and to the proper depth.

I attain these objects by the mechanism illustrated in the accompanying drawings in which:

Figure 1 is a plan of the top of the frame, showing the fixed slots through which the knife is passed when sticking and when bleeding a turkey or fowl, and also the means whereby the space between the two sides or divisions of the frame is increased or decreased, according to the size of the head of the turkey or fowl to be operated on.

Similar figures refer to similar parts throughout the several views.

Referring to the drawings:—

Figure 1:
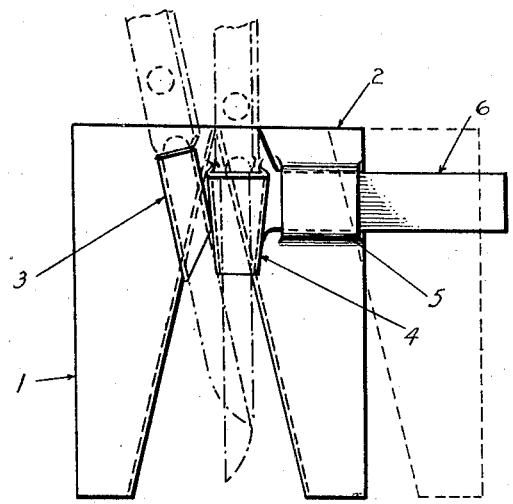
Figure 2:
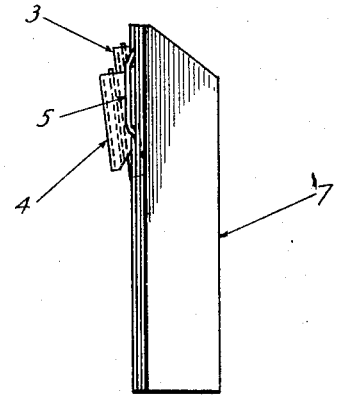
Figure 2 is a side elevation of the frame showing that portion of the frame which holds the head of the turkey or fowl in position, and the position of the fixed slots attached to the top of the frame for the guiding of the knife, and for the guiding of the two parts of the frame as the distance between them is widened or narrowed.
Figure 3:
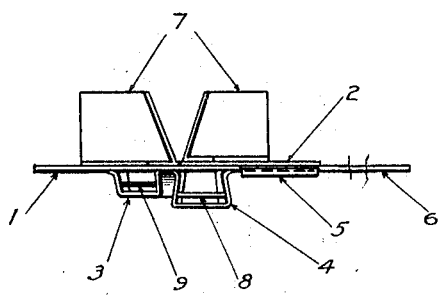
Figure 3 is an end elevation of the frame showing the position of all of the above mentioned fixed slots, and the relation of the top and sides of the frame.
Figure 4:
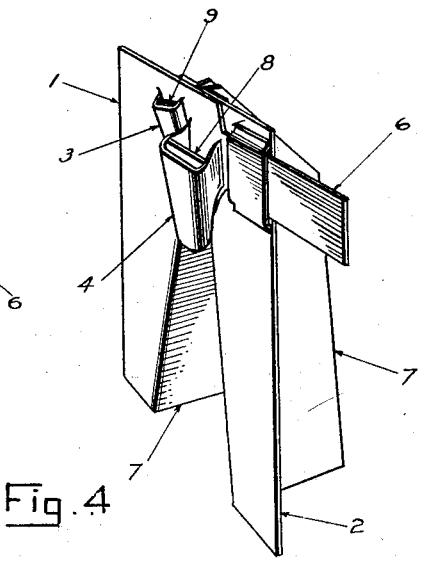
Figure 4 is a drawing of the frame in perspective, showing the relation of all the parts.

1 and 2 represent the top of the frame, and also the left and right hand halves of the frame; 7 the sides of the frame, attached to the top 1 and 2 at right angles thereto, and along its inner diagonal edge. 6 is a strip attached to the left half of the top of the frame shown as 1 in Figure 1, and passing through the slot or sleeve 5, attached to the right half of the top of the frame shown as 2 in Figure 1, thus permitting the right half of the frame to slide along the strip 6, increasing or decreasing the distance between the two halves of the frame, according to the size of the head of a turkey or fowl when inserted between the two halves, as shown by the dotted line in Figure 1. This arrangement may be reversed, with the strip 6 attached to the right half of the frame 2 and the sleeve 5 attached to the left half of frame 1.

The space between the two halves of the frame is made to conform generally to the shape of the head of a turkey or fowl, which is placed between the two sides 7, with the top of the head in reverse position to the tops 1 and 2, and in such position that the strip 6 is inserted between the upper and lower mandibles, and as far back toward the gullet as possible, the whole being held in position by the hand of the operator, grasping the sides 7.

The head of the turkey or fowl, of any size suitable for killing, is then in the proper position with relation to slots 3 and 4 (attached to the left half of the frame 1, or if the frame is reversed as above, then to the right half of frame 2), so that a knife inserted through slot 3 will penetrate the proper point in the mouth of the turkey or fowl for sticking, and when inserted through slot 4 will penetrate the proper point for bleeding.

Slot 3 is of only slightly greater size than the knife used for sticking, in order that the knife may be directed against the proper point in the brain.

Slot 4 is slightly broader than the knife, in order that the proper sweep of the knife point may be permitted to properly sever the arteries of the base of the skull without permitting the knife to cut its way through the neck.

What I claim as my invention is:

1. In a device of the character described, a frame formed in two sections slidably connected to one another and cut out to form therebetween a V-shaped opening adapted to engage with the head of a turkey or fowl and guideways in the frame communicating at different angles with said opening.

2. A frame member comprising two sections slidably connected to one another and adapted to form therebetween an adjustable opening to engage with the head of a fowl, turkey or the like, knife-receiving guideways communicating at different angles with said opening whereby the head of the turkey or fowl is penetrated at different points to first kill and then bleed said turkey or fowl.

3. A frame adapted to hold the head of a turkey or fowl in position for sticking and bleeding and comprising an adjustable frame member adapted to engage with the head of the fowl or turkey and hold the mouth open, guideways on the frame designed to direct a knife to first stick and then bleed the fowl or turkey.

4. The combination with an adjustable frame adapted to hold in an operative position the head of a turkey or fowl with the mouth open, of guideways in the frame and a combined manually-operated sticking and bleeding knife, engaging first one guideway and then the other to stick and bleed the turkey or fowl.

In witness whereof I have hereunto set my hand.

CARL BOCH.